US012809497B2

(12) United States Patent
Saraogi et al.

(10) Patent No.: US 12,809,497 B2
(45) Date of Patent: Nov. 24, 2026

(54) METHOD AND APPARATUS FOR COMMISSIONING A DISTRIBUTED ENERGY GENERATION SYSTEM

(71) Applicant: Enphase Energy, Inc., Petaluma, CA (US)

(72) Inventors: Sumit Saraogi, Fremont, CA (US); Ashish Bansal, Bangalore (IN); Selvakumar S. Mariyappan, Bengaluru (IN); Karthik Lakshminarayanan, Bangalore (IN); Darshan Rachamadugu Nanda Kumar, Basavanagudi (IN); Sunil Magalu Srinivas, Murgeshpalya (IN); Andrew James Mitchell, Maribyrnong (AU)

(73) Assignee: Enphase Energy, Inc., Fremont, CA (US)

(*) Notice: Subject to any disclaimer, the term of this patent is extended or adjusted under 35 U.S.C. 154(b) by 567 days.

(21) Appl. No.: 17/381,338

(22) Filed: Jul. 21, 2021

(65) Prior Publication Data

US 2022/0027029 A1 Jan. 27, 2022

Related U.S. Application Data

(60) Provisional application No. 63/054,450, filed on Jul. 21, 2020.

(51) Int. Cl.

| | |
|---|---|
| ***G06F 3/0484*** | (2022.01) |
| ***G06F 3/0481*** | (2022.01) |
| ***G06K 7/10*** | (2006.01) |
| ***G06K 7/14*** | (2006.01) |
| ***H02J 3/38*** | (2006.01) |
| ***H02J 13/13*** | (2026.01) |
| *H02J 101/24* | (2026.01) |
| *H02J 101/28* | (2026.01) |

(52) U.S. Cl.

CPC .......... *G06F 3/0484* (2013.01); *G06F 3/0481* (2013.01); *G06K 7/10366* (2013.01); *G06K 7/1417* (2013.01); *H02J 3/381* (2013.01); *H02J 13/13* (2026.01); *H02J 2101/24* (2026.01); *H02J 2101/28* (2026.01)

(58) Field of Classification Search

CPC ... G06F 3/0481; H02J 3/381; H02J 13/00006; H02J 2300/24; H02J 2300/28

See application file for complete search history.

(56) References Cited

U.S. PATENT DOCUMENTS

| | | | | |
|---|---|---|---|---|
| 10,540,530 | B2 * | 1/2020 | Yoscovich ........... | G06K 7/1413 |
| 11,067,957 | B2 | 7/2021 | Harif | |
| 2010/0236253 | A1 * | 9/2010 | Adam ............... | H02J 13/00002 60/39.12 |
| 2010/0324962 | A1 * | 12/2010 | Nesler ....................... | G05F 1/66 705/412 |

(Continued)

OTHER PUBLICATIONS

Performance Test Protocol for Evaluating Inverters Used in Grid-Connected Photovoltaic Systems (Year: 2004).*

(Continued)

*Primary Examiner* — Arleen M Vazquez
*Assistant Examiner* — Denise R Kravias
(74) *Attorney, Agent, or Firm* — Moser Taboada

(57) ABSTRACT

Method and apparatus for commissioning a distributed energy generation system.

20 Claims, 9 Drawing Sheets

(56) References Cited

U.S. PATENT DOCUMENTS

| | | | | |
|---|---|---|---|---|
| 2011/0047418 | A1* | 2/2011 | Drees | H02J 13/00016 714/57 |
| 2011/0246338 | A1* | 10/2011 | Eich | G06F 30/00 705/28 |
| 2014/0125125 | A1 | 5/2014 | Wyatt | |
| 2014/0195206 | A1 | 7/2014 | Eich | |
| 2016/0043684 | A1* | 2/2016 | Harif | H04L 67/02 700/287 |
| 2016/0079752 | A1* | 3/2016 | Matan | H02J 3/01 307/24 |
| 2016/0336747 | A1 | 11/2016 | Hobbs et al. | |
| 2017/0288599 | A1 | 10/2017 | Chapman et al. | |
| 2018/0351401 | A1 | 12/2018 | Binder et al. | |
| 2019/0095666 | A1* | 3/2019 | Yoscovich | G06K 7/10366 |
| 2020/0003442 | A1* | 1/2020 | Pancholi | F24F 11/46 |
| 2020/0132328 | A1* | 4/2020 | Boettcher | F24F 11/30 |

OTHER PUBLICATIONS

PCT International Search Report and Written Opinion for Application No. PCT/US2021/042468 dated Nov. 11, 2021, 11 pgs.

* cited by examiner

400

1200

METHOD AND APPARATUS FOR COMMISSIONING A DISTRIBUTED ENERGY GENERATION SYSTEM

RELATED APPLICATION

This application claims benefit to U.S. Provisional Patent Application Ser. No. 63/054,450, filed 21 Jul. 2020 and entitled "Method And Apparatus For Commissioning A Distributed Energy Generator System," which is hereby incorporated herein in its entirety by reference.

BACKGROUND

Field

Embodiments of the present invention generally relate to distributed energy generation systems and, in particular, to a method and apparatus for commissioning a distributed energy generation system.

Description of the Related Art

A distributed energy generation system typically comprises a plurality of energy generators (e.g., solar panels, wind turbines, etc.), one or more power converters (e.g., optimizers, microinverters, inverters, etc.), and a service panel to connect the system to loads and/or a utility power grid. For a solar system, the solar panels are arranged in an array and positioned to maximize solar exposure. Each solar panel or small groups of panels may be coupled to a power converter (so-called micro-inverters) or all the solar panels may be coupled to a single inverter via DC-DC optimizers. The inverter(s) convert DC power produced by the solar panels into AC power. The AC power is coupled to the service panel for use by a facility (e.g., home or business), supplied to the power grid, and/or coupled to an optional storage element such that energy produced at one time is stored for use at a later time. Other energy generators having flexible capacity that is defined at installation include wind turbines arranged on a so-called wind farm. Storage elements may be one or more of batteries, fly wheels, hot fluid tank, hydrogen storage or the like. The most common storage element is a battery pack (i.e., a plurality of battery cells) having a bidirectional inverter coupled to the service panel to supply the batteries with DC power as well as allow the batteries to discharge through the inverter to supply AC power to the facility when needed.

Once a system is purchased, installers arrive at the job site to position racking on a roof, arrange the solar panels, cabling and their related inverters. The cabling is tied into a service panel. Typically, each panel and inverter contains a removable barcode that is peeled from the device and placed on a paper diagram of the plan form of the system. Once the system is installed, an installer scans the barcodes on the paper to identify the panels and inverters that were installed and logged them into computer software such that the installer has a record of the devices that were installed at the job site, The commissioning process that leads to energy production from the system is typically a manual process. A gateway to the Internet is started and paired with the inverter(s) such that power generation is monitored. The installer connects, for example, a laptop to the gateway to manually configure the gateway and the inverter(s). If storage is available, the storage system also requires separate configuration. Once configured, each inverter reports its status and energy production data to the gateway. The gateway sends the information to a monitoring server that makes the information available to the installer as well as to a system owner, e.g., homeowner of a residential system, via the Internet. The commissioning process is labor intensive and time consuming.

Therefore, there is a need for a method and apparatus configured to provide an efficient, automated commissioning process for a distributed energy generation system.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention comprise apparatus and methods for commissioning distributed energy generation systems. Embodiments of the invention utilize an application executing on a user device (e.g., a mobile device such as a smart phone or tablet) as an interface to an installer (i.e., a commissioning software user). The interface may be available on an installer's mobile device, e.g., smart phone, personal digital assistant, pad device, laptop computer, notebook computer, or the like. The interface facilitates interaction with the distributed energy generation system to commission a newly installed system and complete the installation process.

Figure 1:
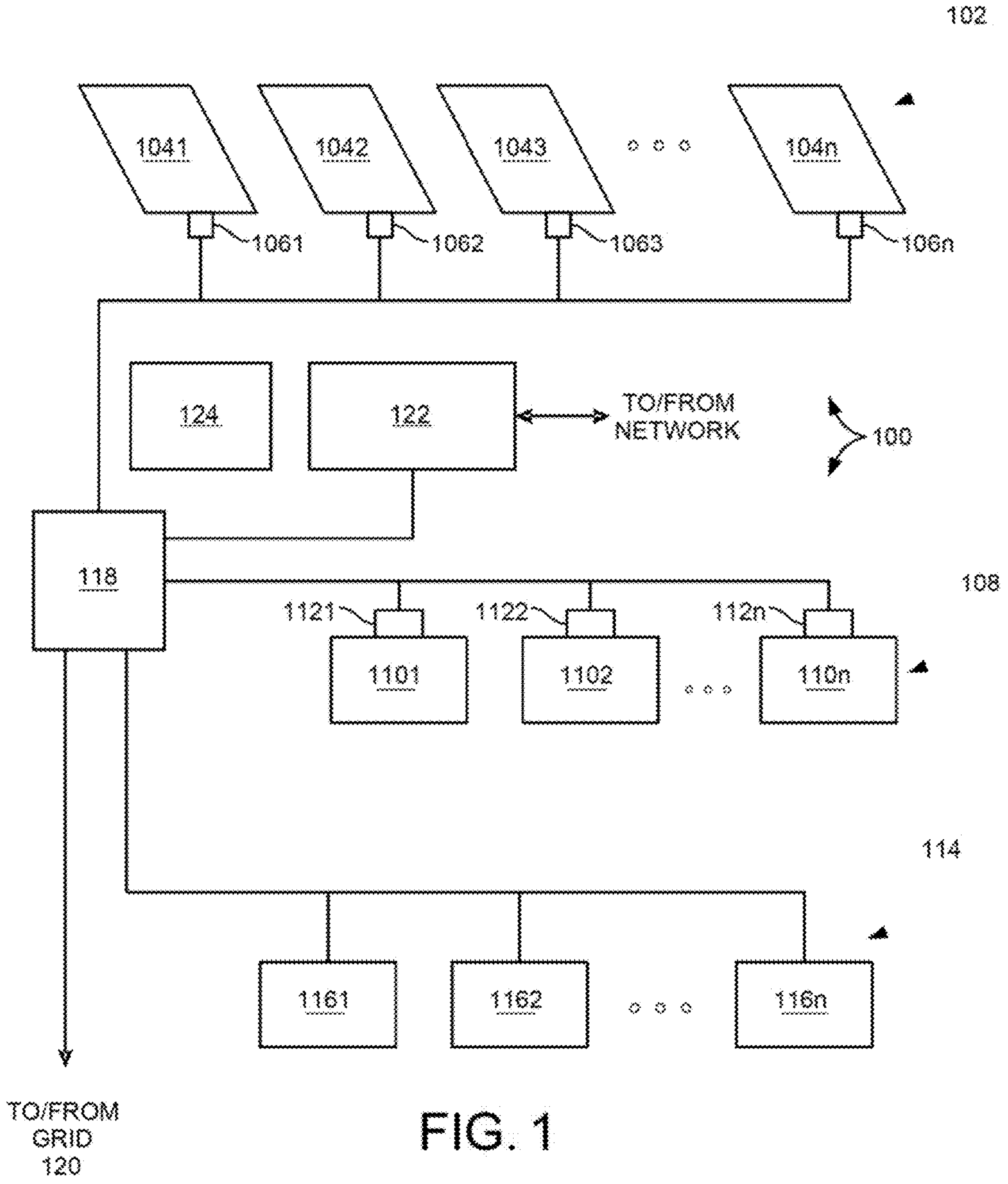
FIG. 1 depicts a block diagram of distributed energy generation system to be commissioned in accordance with at least one embodiment of the invention.

FIG. 1 depicts a block diagram of distributed energy generation system 100 that is to be commissioned in accordance with at least one embodiment of the invention. The system 100 comprises a plurality of distributed generators 102 (e.g., solar panels $\mathbf{104}_1$, $\mathbf{104}_2$, $\mathbf{104}_3$, . . . $\mathbf{104}_n$ coupled to power converters $\mathbf{106}_1$, $\mathbf{106}_2$, $\mathbf{106}_3$, . . . $\mathbf{106}_n$), optional energy storage 108 (e.g., batteries $\mathbf{110}_1$, $\mathbf{110}_2$, . . . $\mathbf{110}_n$ coupled to bidirectional power converters $\mathbf{112}_1$, $\mathbf{112}_2$, . . . $\mathbf{112}_n$), a service panel 118 through which the distributed generator 102 is coupled to the storage 108, and at least one gateway 122 configured to communicate with the distributed generators 102, storage 108 and a communication network (Internet). The service panel 118 is also coupled to a plurality of loads 114 represented by loads $\mathbf{116}_1$, $\mathbf{116}_2$, . . . $\mathbf{116}_n$. The loads 114, in a residential application, may comprise washer, dryer, refrigerator, air conditioner, hot water heater, electric vehicle, and/or any other electricity consuming device in the household. The loads 114, in an industrial application, may comprise electric motors, heating systems, air conditioning systems, refrigerators, freezers, and/or any other electricity consuming device generally used in an industrial setting. The service panel 118 may also be coupled to the power grid 120, such that, energy may be consumed from the grid 120 or sourced to the grid 120, as necessary. As shall be described below, embodiments of the present invention facilitate commissioning the distributed generators 102 and/or storage 108.

An energy generator commissioning apparatus 124 interacts with the components of the system 100 to identify the components, couples to the gateway 122 (either directly or indirectly through the network) and couples to the network. The structure of the commissioning apparatus 124 is described in detail with respect to FIG. 2 below and the operation of the commissioning apparatus is described in detail with respect to FIGS. 3-12 below.

Figure 2:
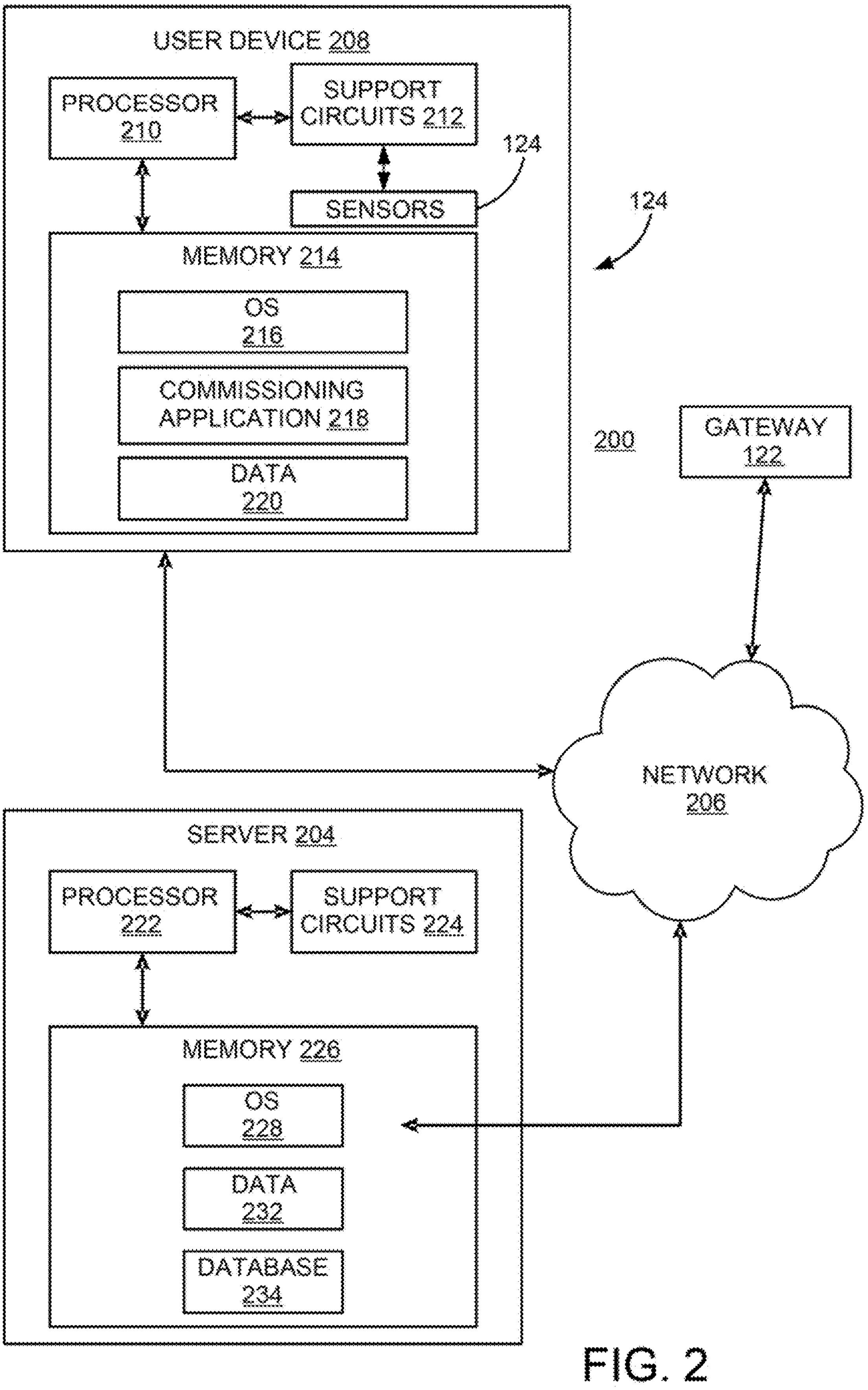
FIG. 2 depicts a block diagram of a computer system that is used to commission a distributed energy generation system in accordance with at least one embodiment of the invention.

Although FIG. 1 depicts a distributed generator 102 having a single solar panel coupled to a single power converter (i.e., micro-inverter, optimizer and the like), this depiction is not meant to limit the scope of the invention. For example, embodiments of the invention may also be used with distributed generators having a plurality or more solar panels coupled to one or more power converters. In other examples, the power converters (so called optimizers or DC-DC converters) may be coupled to a single DC AC inverter. Furthermore, distributed generators may include other forms of energy generation such as wind turbines arranged on a so-called "wind farm". Similarly, energy storage in a battery-based storage system is described as an example of the type of storage whose capacity is estimated using embodiments of the invention; however, other forms of energy storage may be used such as fly wheel(s), hot fluid tank(s), hydrogen storage system(s), pressurized gas storage system(s), pumped storage hydropower, fuel cells, or the like FIG. 2 depicts a block diagram of a computer system 200 supporting the energy generator commissioning apparatus 124 ("commissioning apparatus" or "commissioner") in accordance with an embodiment of the invention. The computer system 200 comprises a server 204, a computer network 206 (e.g., Internet) and at least one user device 208 (e.g., mobile phone, digital assistant, computer, or any other device capable of displaying a web page). In operation, the user device 208 executes an application (an "app") and displays a user interface for user interaction. The user device 208, when executing specific software (i.e., instructions), enables the general-purposes device to operate as a specific-purpose device. Specifically, the user device operates as a commissioner 202 to commission a newly installed energy generation system. The server 204 provides support information (e.g., maps, installed energy generator data, etc.) to the user device 208 and also stores information (e.g., commissioning data for the system being commissioned) sent from the user device 208.

The user device 208 comprises at least one processor 210, support circuits 212, memory 214 and at least one sensor 236. The at least one processor 210 may be any form of processor or combination of processors including, but not limited to, central processing units, microprocessors, microcontrollers, field programmable gate arrays, graphics processing units, and the like. The support circuits 212 may comprise well-known circuits and devices facilitating functionality of the processor(s). The support circuits 212 may comprise one or more of, or a combination of, power supplies, clock circuits, communications circuits, cache, and/or the like. The at least one sensor 236 may be an imaging device (i.e., a camera) capable of capturing images of component identifiers such as bar codes, QR codes, serial numbers and the like. Alternatively, or additionally, the at least one sensor 236 may be an RF transceiver or receiver coupled to an antenna for sensing signals from RHO devices or other forms of transmission based identifier.

The memory 214 comprises one or more forms of non-transitory computer readable media including one or more of, or any combination of, read-only memory or random-access memory. The memory 214 stores software and data including, for example, an operating system (OS) 216, a commissioning application 218, and data 210. The operating system 216 may be any form of operating system such as, for example, Apple iOS, Microsoft Windows, Apple macOS, Linux, Android or the like. The commissioning application 218 may be software (i.e., instructions) that, when executed by the processor(s) 210, is capable of generating a commissioning user interface as well as performing the commissioning methods in accordance with embodiments of the invention described below. When executing the commissioning application 218, the user device 208 operates as the commissioning apparatus described in detail with respect to FIGS. 3-12 below. The data 220 may include information to be sent to the server 204 or gateway 122 and/or information that is entered/gathered at the site of the distributed generator.

The server 204 comprises at least one processor 222, support circuits 224 and memory 226. The at least one processor 222 may be any form of processor or combination of processors including, but not limited to, central processing units, microprocessors, microcontrollers, field programmable gate arrays, graphics processing units, and the like. The support circuits 224 may comprise well-known circuits and devices facilitating functionality of the processor(s). The support circuits 224 comprise one or more of, or a combination of, power supplies, clock circuits, communications circuits, cache, and/or the like.

The memory 226 comprises one or more forms of non-transitory computer readable media including one or more of, or any combination of, read-only memory or random-access memory. The memory 226 stores software and data including, for example, an operating system (OS) 228, data 232, and a database 234. The operating system 228 may be any form of operating system such as, for example, Apple iOS, Microsoft Windows, Apple macOS, Linux, Android or the like. The data 220 may include data received from the commissioning application and/or any other data used by the server 204 to support operation of the commissioning application 218. The database 234 contains data to support operation of the commissioning application 218. This data may include, but is not limited to, mapping information, locations of an installers job sites and prior installations, and/or the like. The database 234 may be locally stored at the server 204 or may be remotely stored on another server or servers and accessed via the network 206.

The user device 208, when executing the commissioning application 218, is transformed from a general-purpose device into a specific-purpose device, i.e., transformed into the commissioning apparatus 124. The commissioning application 218, when executed, enables at least one user device 208 to access and interact with the server 204 and the distributed generator system. The access and interaction shall be described with respect to FIG. 3.

Figure 3:
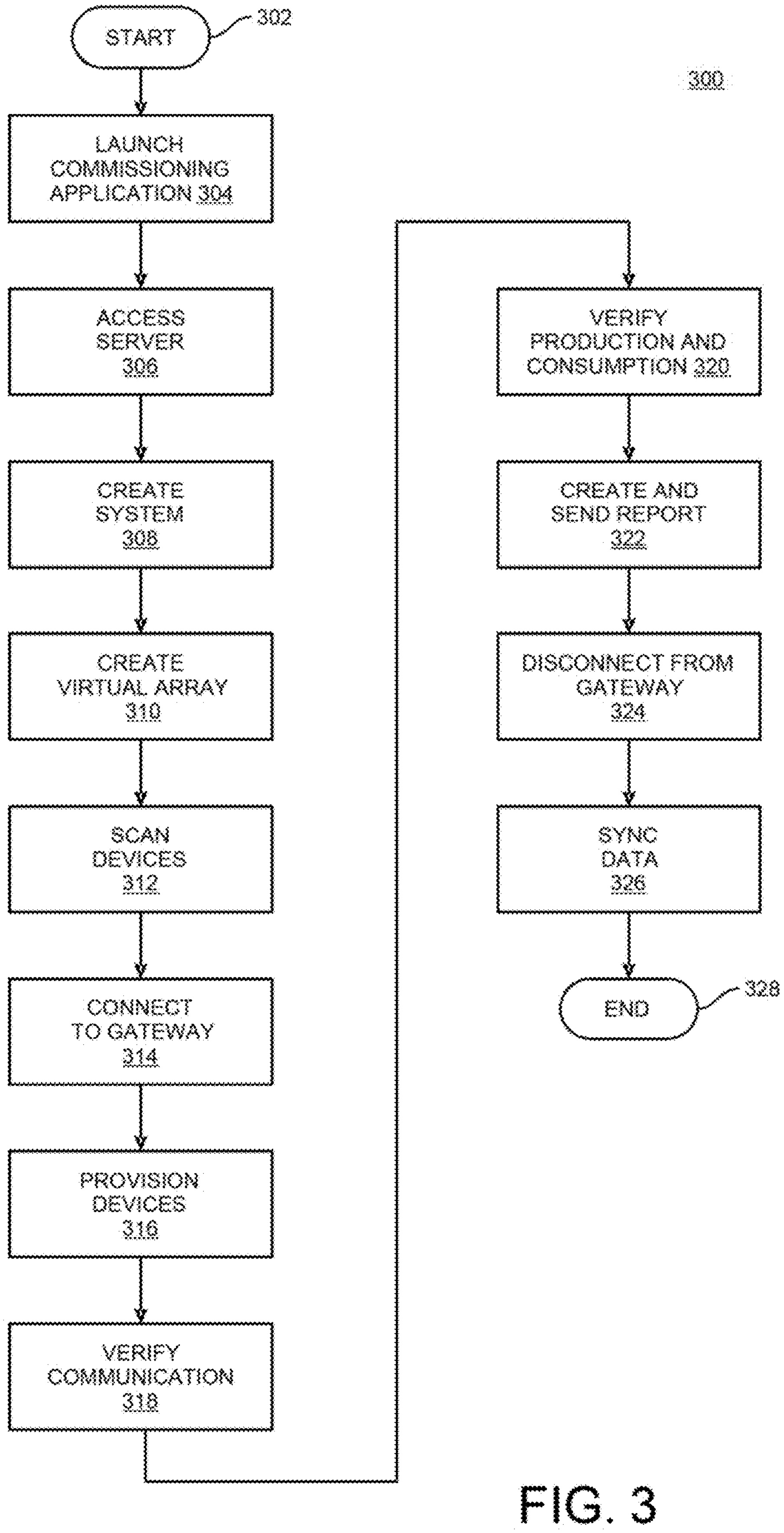
FIG. 3 depicts a flow diagram of a method that is performed upon executing a commissioning software application in accordance with an embodiment of the invention.

FIG. 3 depicts a flow diagram of a method 300 that is performed upon executing the commissioning software application (218 of FIG. 2) in accordance with at least one embodiment of the invention. Using the commissioner (124 in FIGS. 1 and 2) to commission a newly installed energy generation system (100 in FIG. 1) is a non-limiting example of a use for the commissioner. Each block of the flow diagrams below may represent a module of code to execute and/or combinations of hardware and/or software configured to perform one or more processes described herein. Though illustrated in a particular order, the following figures are not meant to be so limiting. Any number of blocks may proceed in any order (including being omitted) and/or substantially simultaneously (i.e. within technical tolerances of processors, etc.) to perform the operations described herein.

FIG. 3 depicts a method 300 that is performed when user device 203 of FIG. 2 executes the commissioning application 218. The method 300 begins at 302 and proceeds to 304 where a user (typically, a system installer), through the user device, launches the commissioning application.

At 306, the method 300 may access the server and, at 308, create a new system record containing, for example, system owner information (e.g., name, address, etc.) and system details (e.g., expected energy production, number of solar panels, amount of storage, etc.). At step 310, through interaction with the user, the method 300 creates a virtual array, for example, a schematic plan view layout of the solar array. A user may manipulate the layout, for example, the layout may be placed in landscape or portrait views, rotated, or tilted. At 312, the user uses a camera (typically, a camera within the user device) to scan an identifier located on each component (e.g., solar panel, microinverter, optimizer, power converter, inverter, storage element, gateway, etc.) in the energy generation system. In one embodiment, the scan is of an indicium to identify the component (i.e., an identifier) such as a bar code, QR code, serial number, RFID, or some other identifier affixed to or transmitted from each component. In systems containing more than one gateway, the components that communicate to the gateway(s) are assigned to a particular gateway.

At 314, the method 300 may connect the user device to the gateway. This connection may be via wired or wireless connections including WiFi, Bluetooth, cellular or any other available communication protocol. In one embodiment, the connection is made through a connection to the system owner's WiFi In another embodiment, the connection is made directly to the gateway via Bluetooth, WiFi, cellular or a wired connection, known as having the gateway operate in an "access point" mode. The type of connection may be configured from within the commissioning application.

Once connected to the gateway, at 316, the method 300 may provision the devices that were previously scanned. All power conversion and/or storage devices are provisioned in a single step, i.e., the devices are communicatively connected to the gateway and may be provisioned substantially simultaneously. Provisioning entails having the gateway propagate a grid profile to the power converter devices (e.g., optimizers, microinverters, inverters and the like) that produce, store or produce and store energy within the system and report an operational state of the devices. The grid profile contains, for example, frequency and voltage parameters to ensure the power converters are setup to be in compliance with the local utility power grid parameters to ensure interoperability. At 318, the communication connections are verified by the method 300 to ensure the gateway is communicatively coupled to the power converter devices that produce, store or produce and store energy within the system.

At 320, system energy production and consumption may be verified. To verify energy production, a production meter within the gateway (or coupled to the gateway) is set up to measure the amount of energy produced by the energy generation system. The method compares the current production with an amount that the system is expected to produce to verify proper system operation. Similarly, a consumption meter is set up and tested to measure the amount of energy consumed by loads at the facility. If storage is included in the system, the method 300 may also establish and verify metering for the amount of energy stored.

At 322, a summary report may be created and sent (e.g., via in-app communications, email or text message) to the user's team, office, system owner, etc. The report may contain, for example, but not limited to, energy production (today and lifetime), energy consumption (today and lifetime), gateway connectivity, system operation information (number of power converters, how many power converters communicating, storage units communicating etc.), and a profile of the grid to which the system may be connected.

At 324, the method 300 disconnects the user device from the gateway. Once the user device is disconnected from gateway, i.e., exits the access point mode, the method 300 may reconnect to the cellular or WiFi network to facilitate synchronizing, at 326, the system data created while commissioning the system with the server. The method 300 ends at 328.

FIGS. 4 through 12 depict exemplary screen images of screens created by the method 300 to support the functionality described above.

Figure 4:
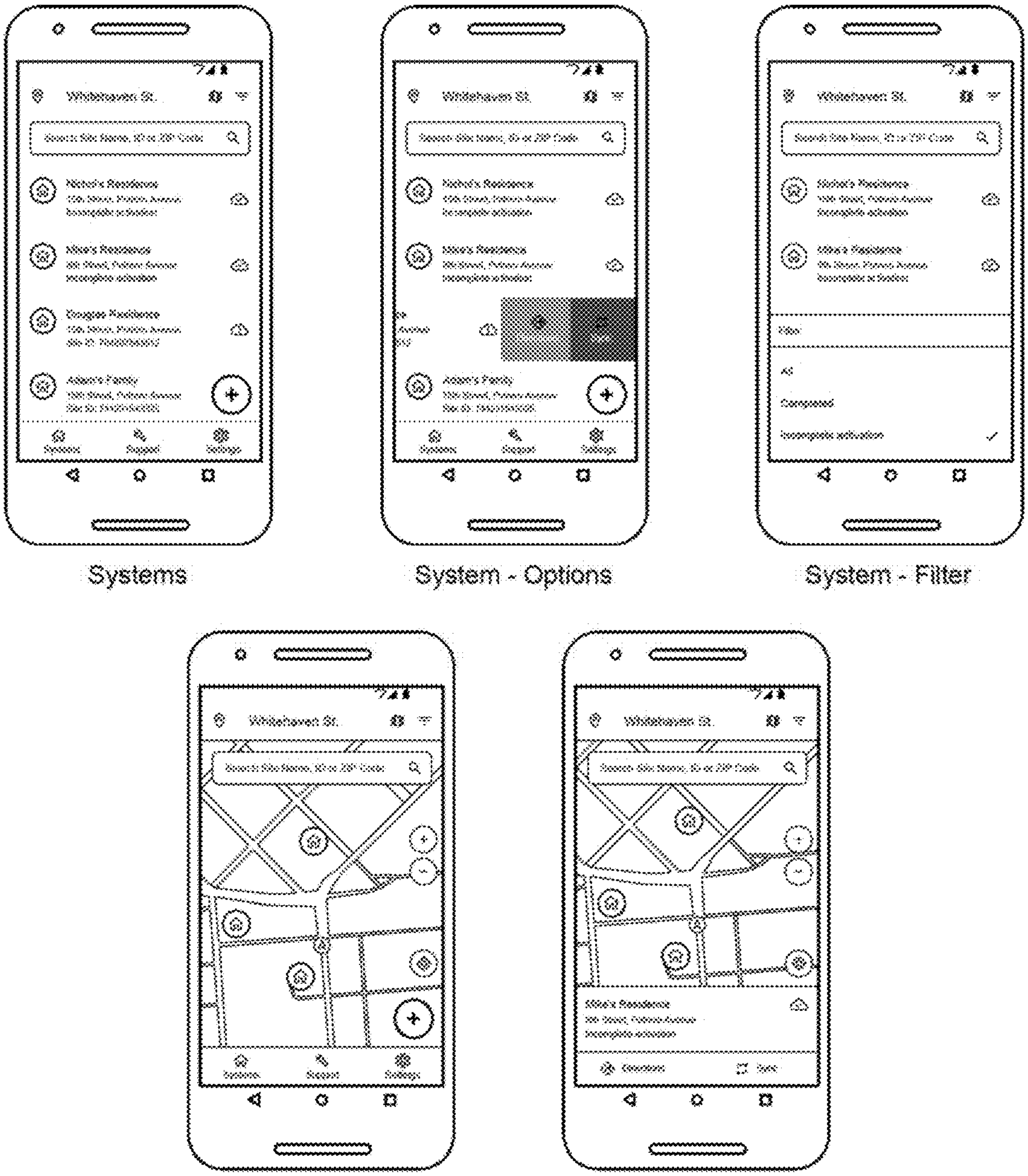
FIGS. 4, 5, 6, 7, 8, 9, 10, 11 and 12 depict screen images on a user device used as an interface to the commissioning method of FIG. 3 in accordance with an embodiment of the invention.

FIG. 4 depicts screen images 400 of interfaces that may be used at 308 to create a system record. The user may display all the system records as a list or on a map. A new system address can be entered via fields or by selecting the location on a map.

Figure 5:
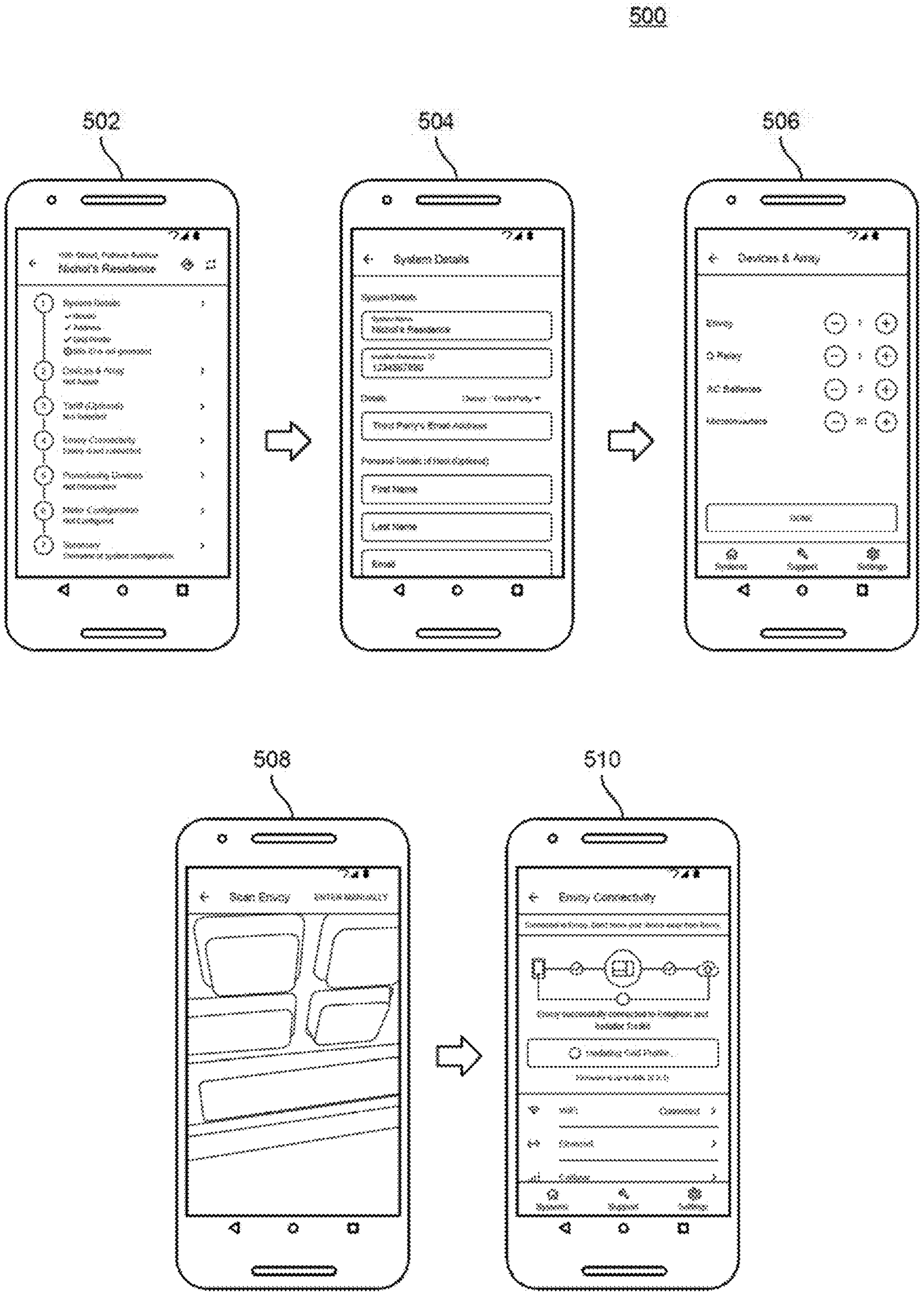

FIG. 5 depicts a progression of screen images 500 of interfaces that may be used to enter information to further create a system record—screen image 502 for entering owner information, screen image 504 for entering system details, screen image 506 for enteringiscanning device and array information, screen image 508 for scanning the gateway identifier, and screen image 508 for connecting to the gateway at 314.

Figure 6:
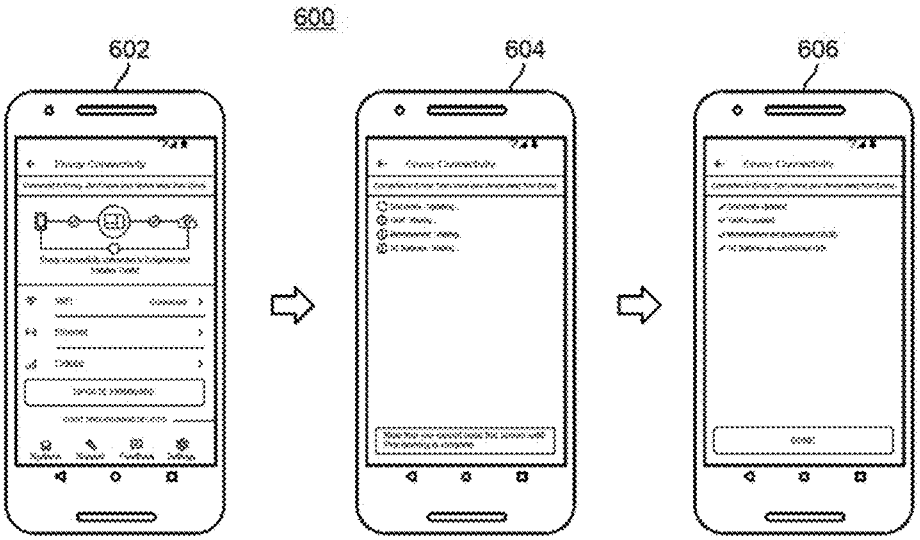

FIG. 6 depicts a progression of screen images 600 of interfaces that may be used to provision the system at 316. Screen image 602 depicts the gateway in the access point mode being connected to the user device, screen image 604 depicts information displayed during provisioning and screen image 606 depicts the display upon completion of the device provisioning.

Figure 7:
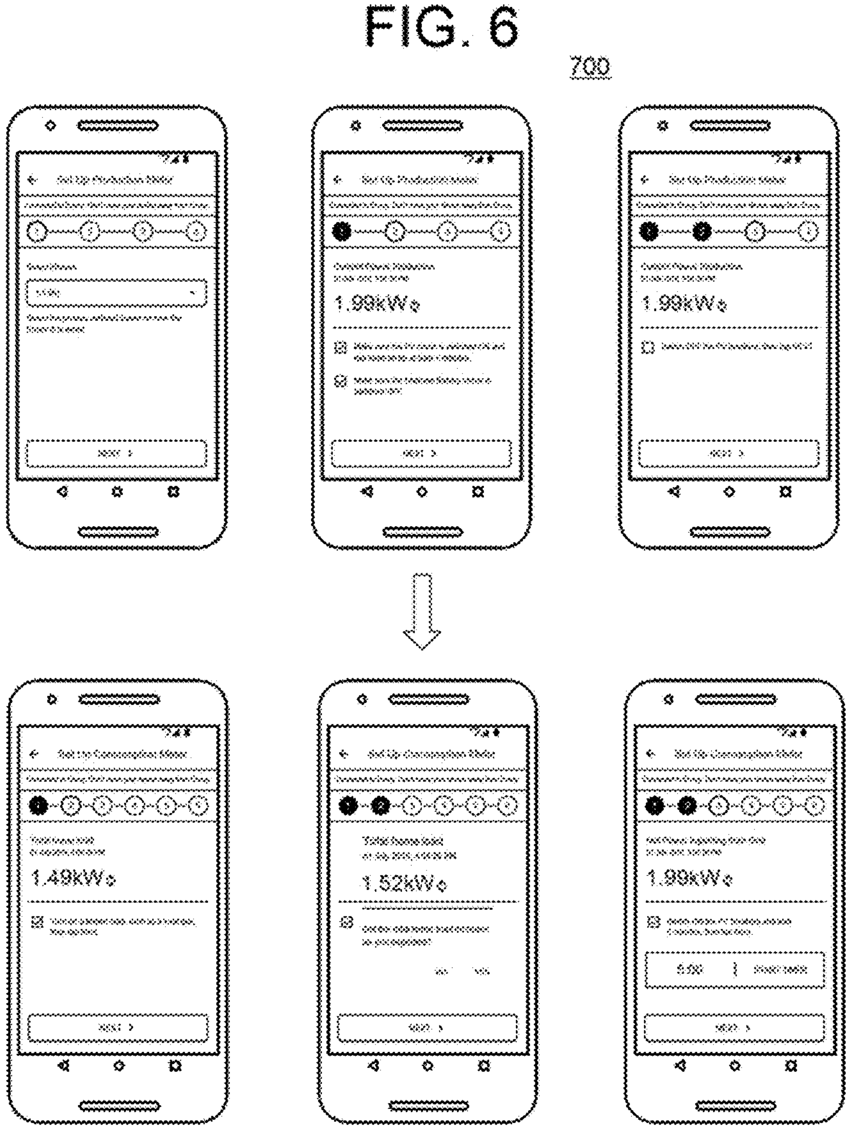

FIG. 7 depicts screen images 700 of interfaces that may be used to configure production and consumption meters within (or connected to) the gateway at 320 of FIG. 3.

Figure 8:
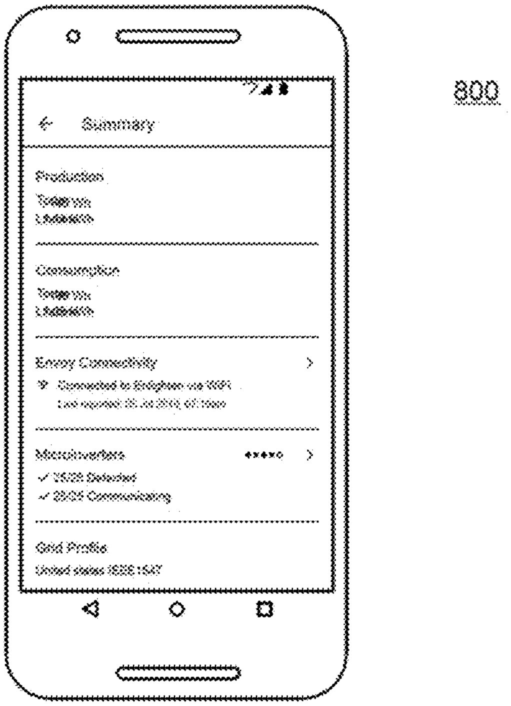

FIG. 8 depicts a screen image 800 of an interface of an exemplary report created and sent at 322 of FIG. 3.

Figure 9:
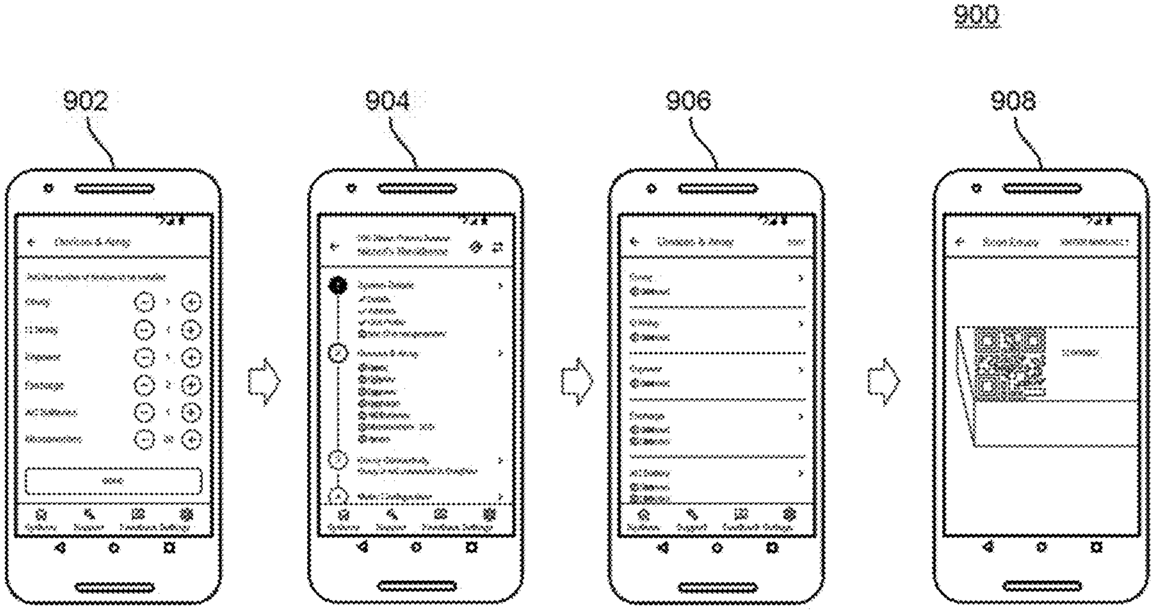

FIG. 9 depicts a progression of screen images 900 of interfaces that may be used for scanning the components at 312 of FIG. 3. The number of components forming the system are added using the screen in screen image 902. After the DONE button is entered, a summary of the system is displayed such as shown in screen image 904. Screen image 906 summarizes the number of components that have been scanned and screen image 908 depicts a component QR code being imaged by the user device camera. Once the image is captured and processed, screen image 906 reappears with an updated number of components that have been scanned.

Figure 10:
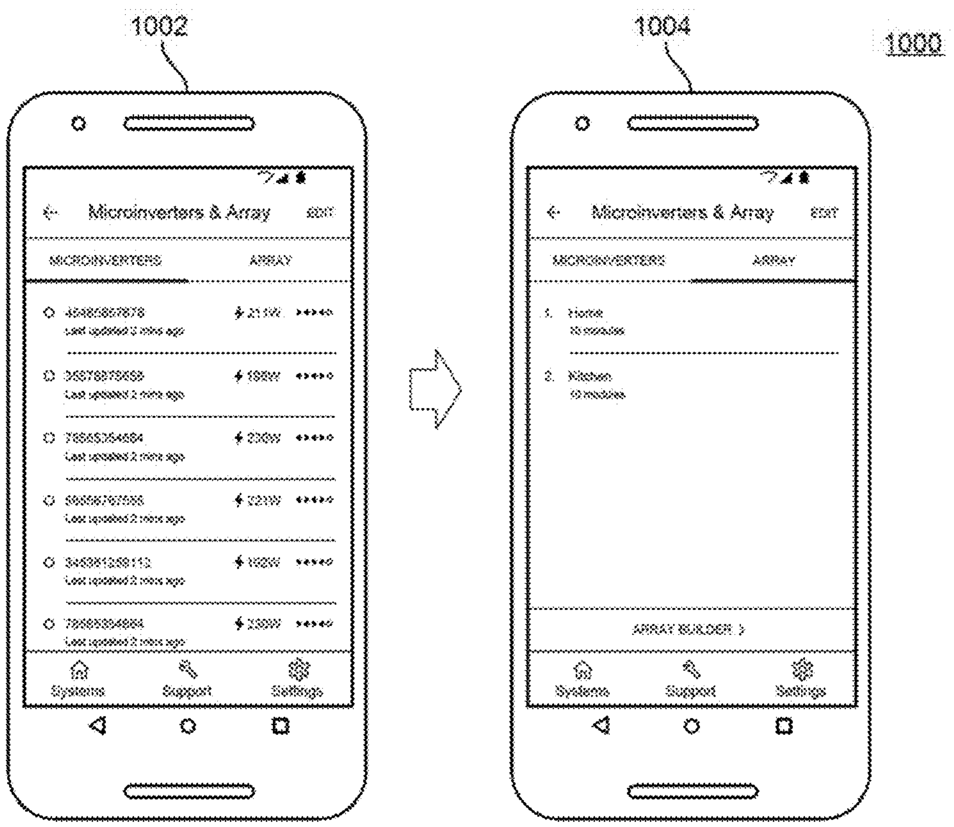

FIG. 10 depicts a progression of screen images 1000 of interfaces that may be used to display the list of scanned microinverters in image 1002 and arrange them into an array in image 1004.

Figure 11:
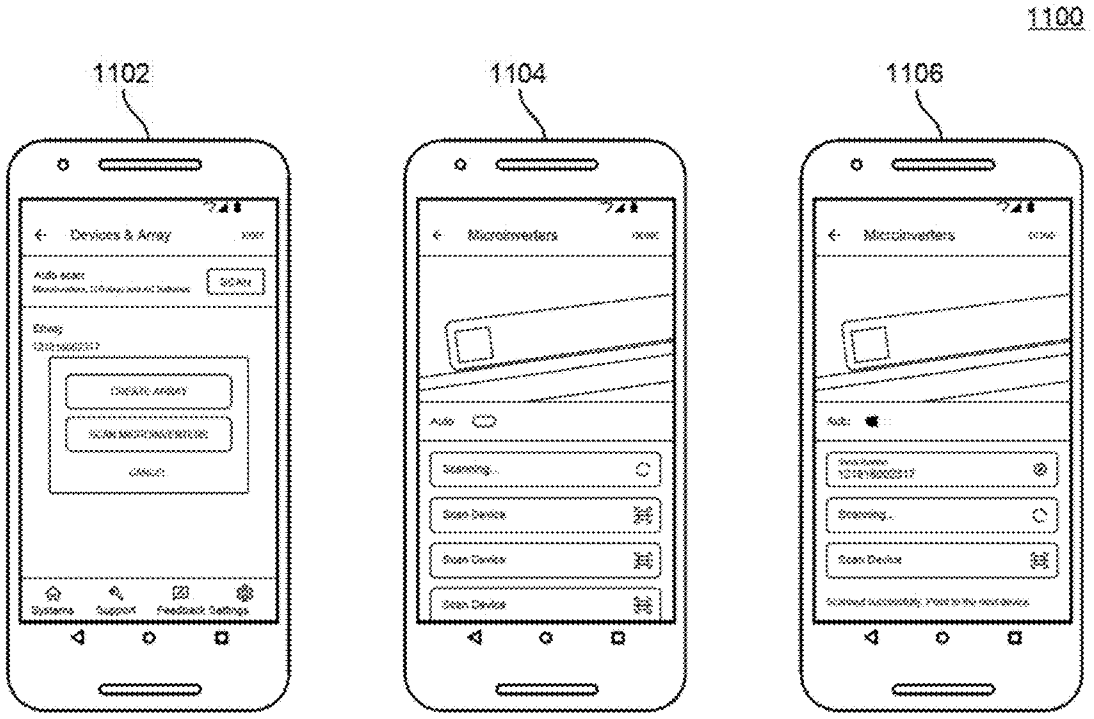

FIG. 11 depicts a progression of screen images 1100 of interfaces that may be used to scan devices at 312 in a rapid scan mode. Screen image 1102 enables a user to select either the array builder or component scan mode. Screen image 1104 depicts the user device in component scan mode and imaging a component QR code. When the "auto" mode is selected by moving the auto "switch" to the right in the "on" position, the application enters rapid scan mode such that merely moving the camera to the next component will automatically capture the next OR code image as well as update the component information related to the additional component. As such, a series of microinverter OR codes may be scanned in sequence very quickly. When all the microinverters are scanned, the user selects DONE.

Figure 12:
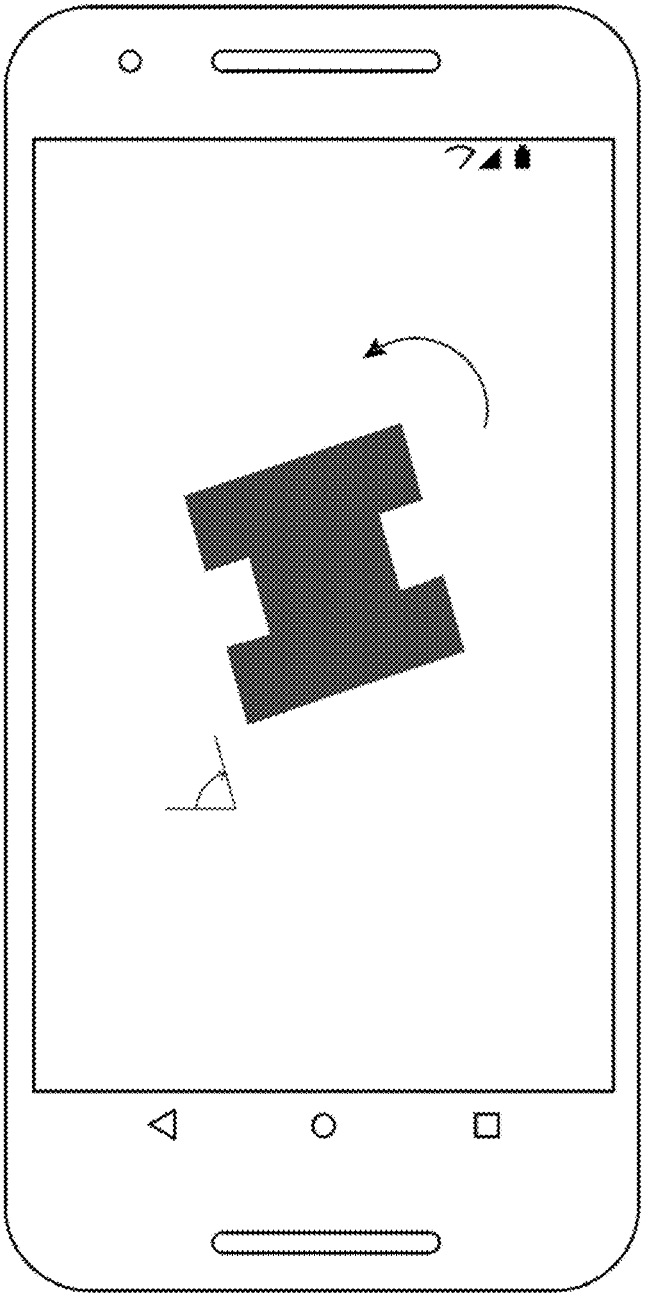

FIG. 12 depicts a screen image 1200 of an interface that may be used to display a virtual array via the array builder feature in accordance with an embodiment of the present invention. The array may be manipulated via the touch screen to change views between portrait and landscape, rotate the array (arrow), tilt the array (angle), and/or the like.

Various other screens may be used to enable a user to send feedback to a manufacturer, make notes about the system, perform repair, return or replacement tasks and/or the like.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified Where lists are enumerated in the alternative or conjunctive (e.g., one or more of A, B, and/or C), unless stated otherwise, it is understood to include one or more of each element, including any one or more combinations of any number of the enumerated elements (e.g. A, AB, AB, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for commissioning a distributed energy generation system comprising:

a user device comprising:

at least one sensor; and one or more processors coupled to one or more non-transitory computer readable media storing instructions thereon which, when executed by the one or more processors, cause the one or more processors to perform operations comprising:

creating a system record;

scanning, using the at least one sensor, component indicium for at least one component of the distributed energy generation system;

connecting the user device to a gateway of the distributed energy generation system;

provisioning the at least one component of the distributed energy generation system by propagating frequency and voltage parameters to the at least one component to ensure that the at least one component is setup to be in compliance with grid parameters to ensure interoperability, wherein provisioning comprises transmitting from the gateway to the user device a progression of interfaces that provide information to the user device for facilitating provisioning the at least one component of the distributed energy generation system;

verifying energy production and consumption via the gateway which is configured to measure and compare a current production and consumption of the at least one component with an amount of production and consumption that the distributed energy generation system is forecasted to produce to verify proper distributed energy generation system operation;

creating a summary report and sending the summary report to the user device, wherein the summary report comprises at least one of energy production or gateway connectivity; and disconnecting the user device from the gateway.

2. The apparatus of claim 1, wherein scanning further comprises scanning additional component indicia of additional components of the distributed energy generation system and the provisioning further comprises provisioning the additional components of the distributed energy generation system.

3. The apparatus of claim 1, wherein the user device is a mobile device and the at least one sensor is a camera.

4. The apparatus of claim 1, further comprising an operation comprising:

displaying a user interface through which a user interacts with the user device to cause the user device to perform the operations of claim 1.

5. The apparatus of claim 4, wherein the user interface comprises a graphical depiction of the at least one component of the distributed energy generation system.

6. The apparatus of claim 1, wherein connecting further comprises connecting directly from the user device to the gateway.

7. The apparatus of claim 1, wherein provisioning further comprises:

communicating a grid profile to the at least one component that performs at least one of producing, storing, or producing and storing energy.

8. The apparatus of claim 1, wherein the at least one component comprises a plurality of devices that produce, store, or produce and store energy and provisioning further comprises:

substantially simultaneously provisioning the plurality of devices.

9. The apparatus of claim 1, wherein creating the summary report further comprises system operation information associated with the at least one component, and wherein the system operation information associated with the at least one component comprises at least one of a number of power converters, how many power converters are communicating, energy consumption, or how many storage units are communicating.

10. A method for commissioning a distributed energy generation system comprising:

creating a system record via a user device;

scanning, using at least one sensor of the user device, component indicium for at least one component of the distributed energy generation system;

communicatively coupling the user device to a gateway of the distributed energy generation system;

provisioning the at least one component of the distributed energy generation system by propagating frequency and voltage parameters to the at least one component to ensure that the at least one component is setup to be in compliance with grid parameters to ensure interoperability, wherein provisioning comprises transmitting from the gateway to the user device a progression of interfaces that provide information to the user device for facilitating provisioning the at least one component of the distributed energy generation system;

verifying energy production and consumption via the gateway which is configured to measure and compare a current production and consumption of the at least one component with an amount of production and consumption that the distributed energy generation system is forecasted to produce to verify proper distributed energy generation system operation;

creating a summary report and sending the summary report to the user device, wherein the summary report comprises at least one of energy production or gateway connectivity; and disconnecting the user device from the gateway.

11. The method of claim 10, wherein scanning further comprises scanning additional component indicia of additional components of the distributed energy generation system and the provisioning further comprises provisioning the additional components of the distributed energy generation system.

12. The method of claim 10, wherein the user device is a mobile device and the at least one sensor is a camera.

13. The apparatus of claim 10, further comprising:

displaying a user interface through which a user interacts with the user device to cause the user device to perform the method of claim 10.

14. The method of claim 13, further comprising displaying, within the user interface, a graphical depiction of the at least one component of the distributed energy generation system.

15. The method of claim 10, wherein connecting further comprises connecting directly from the user device to the gateway.

16. The method of claim 10, wherein provisioning further comprises:

communicating a grid profile to the at least one component that performs at least one of producing, storing, or producing and storing energy.

17. The method of claim 10, wherein the at least one component comprises a plurality of devices that produce, store, or produce and store energy and provisioning further comprises:

substantially simultaneously provisioning the plurality of devices.

18. The method of claim 10, wherein creating the summary report further comprises system operation information associated with the at least one component, and wherein the system operation information associated with the at least one component comprises at least one of a number of power converters, how many power converters are communicating, energy consumption, or how many storage units are communicating.

19. An apparatus for commissioning a distributed energy generation system comprising:

a user device comprising:

at least one sensor; and one or more processors coupled to one or more non-transitory computer readable media storing instructions thereon which, when executed by the one or more processors, cause the one or more processors to perform operations comprising:

generating and displaying an interactive display screen on the user device for creating a system record;

generating and displaying an interactive display screen on the user device for scanning, using the at least one sensor, component indicium for at least one component of the distributed energy generation system;

generating and displaying an interactive display screen on the user device for connecting the user device to a gateway of the distributed energy generation system;

generating and displaying an interactive display screen on the user device for provisioning the at least one component of the distributed energy generation system by propagating frequency and voltage parameters to the at least one component to ensure that the at least one component is setup to be in compliance with grid parameters to ensure interoperability, wherein provisioning comprises transmitting from the gateway to the user device a progression of interfaces that provide information to the user device for facilitating provisioning the at least one component of the distributed energy generation system;

verifying energy production and consumption via the gateway which is configured to measure and compare a current production and consumption of the at least one component with an amount of production and consumption that the distributed energy generation system is forecasted to produce to verify proper distributed energy generation system operation;

creating a summary report and sending the summary report to the user device, wherein the summary report comprises at least one of energy production, or gateway connectivity; and generating and displaying an interactive display screen on the user device for disconnecting from the gateway.

20. The apparatus of claim 19, further comprising generating and displaying an interactive display screen on the user device comprising a graphical depiction of the at least one component of a distributed energy generation system.

* * * * *